Figure 1:
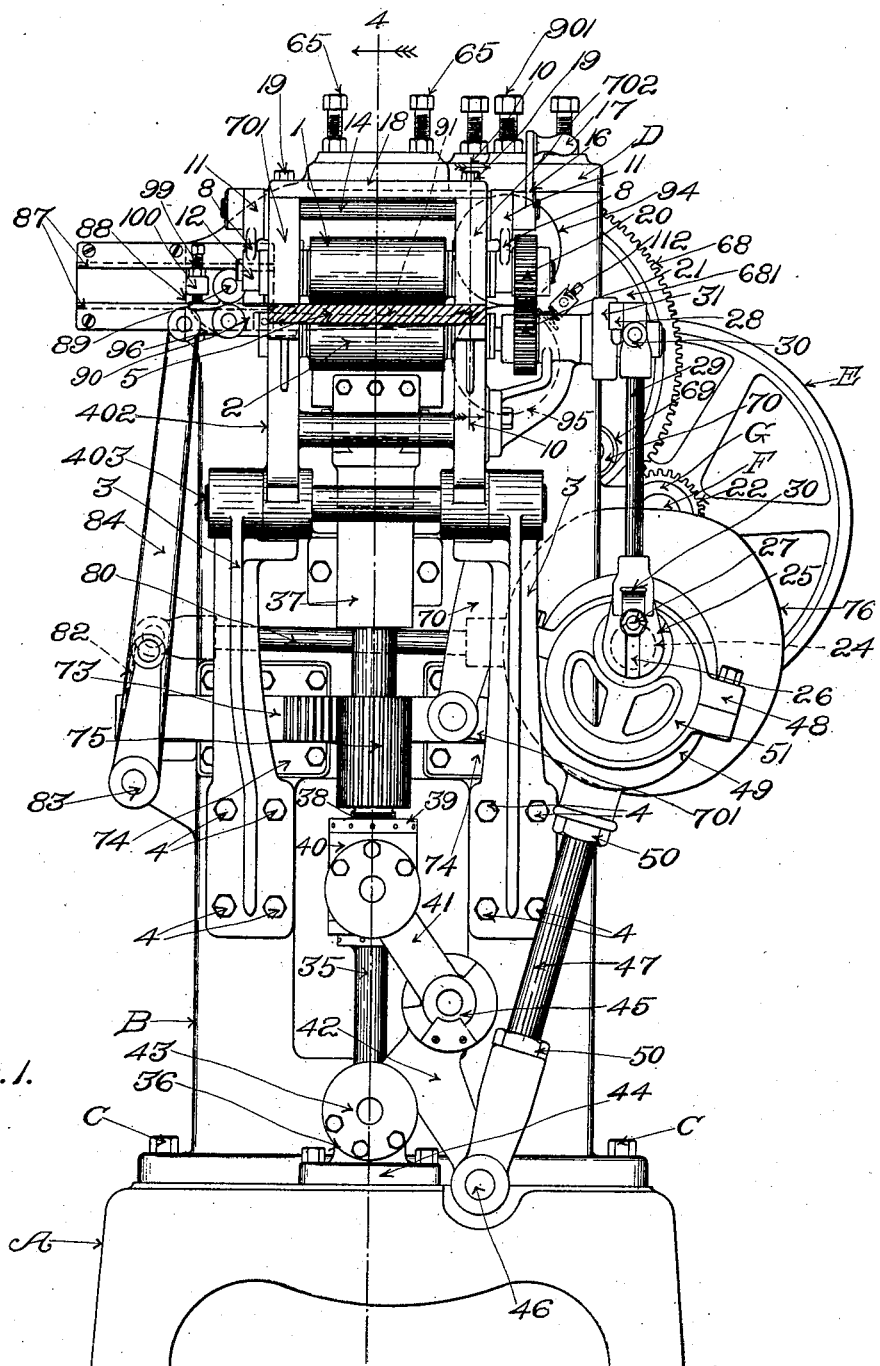

No. 896,953. PATENTED AUG. 25, 1908.
E. H. TAYLOR.
SHANK MACHINE.
APPLICATION FILED MAR. 18, 1905.

6 SHEETS—SHEET 2.

Witnesses:
J. Henry Parker
Robert Wallace.

Inventor:
Eugene H. Taylor,
By Macleod, Calver, Cushman & Dick
Attorneys.

No. 896,953. PATENTED AUG. 25, 1908.
E. H. TAYLOR.
SHANK MACHINE.
APPLICATION FILED MAR. 18, 1905.
6 SHEETS—SHEET 3.
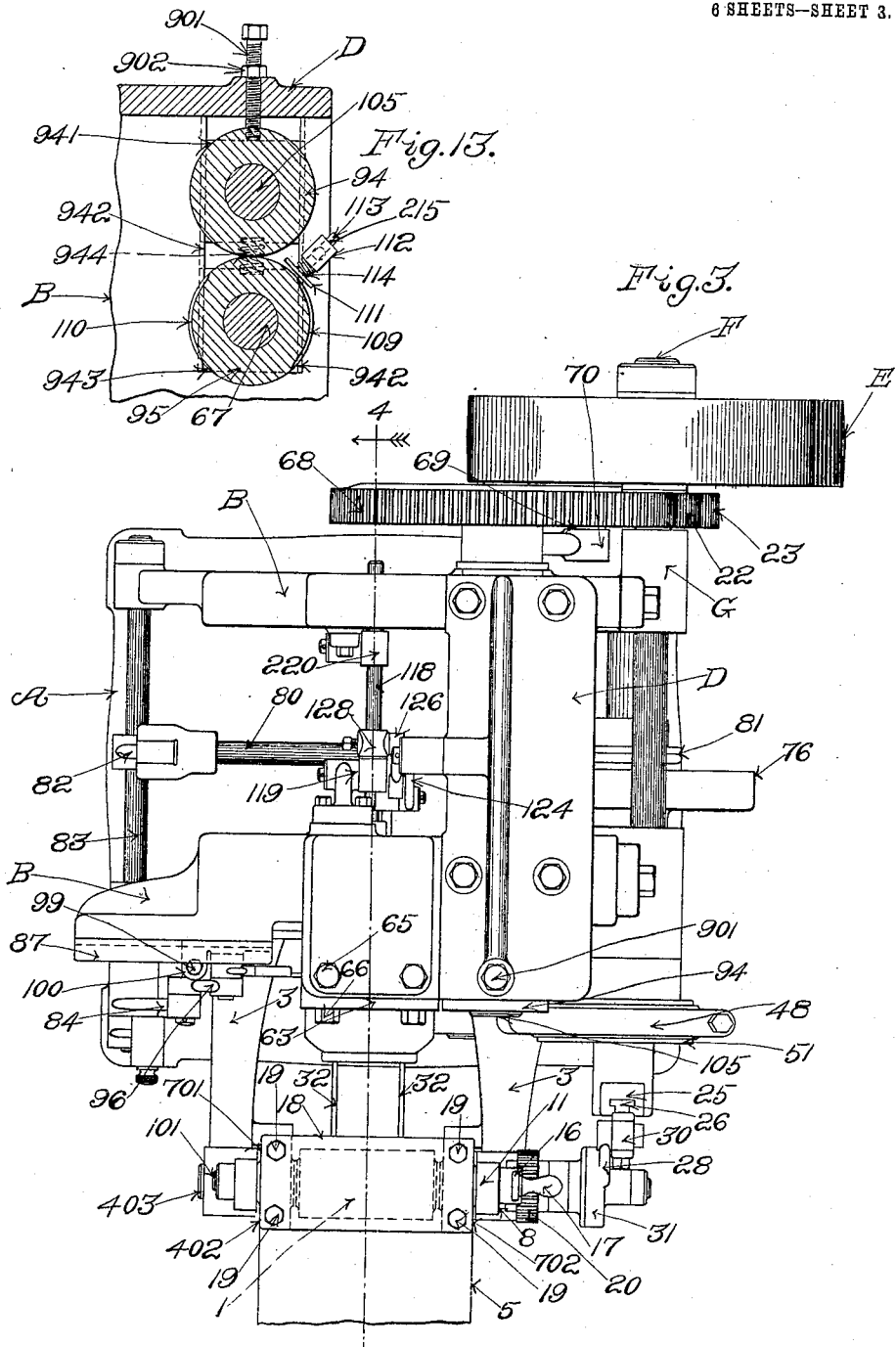
Witnesses:
J. Henry Parker
Robert Wallace
Inventor:
Eugene H. Taylor
By Macleod, Calver, Cushman & Dike
Attorneys.

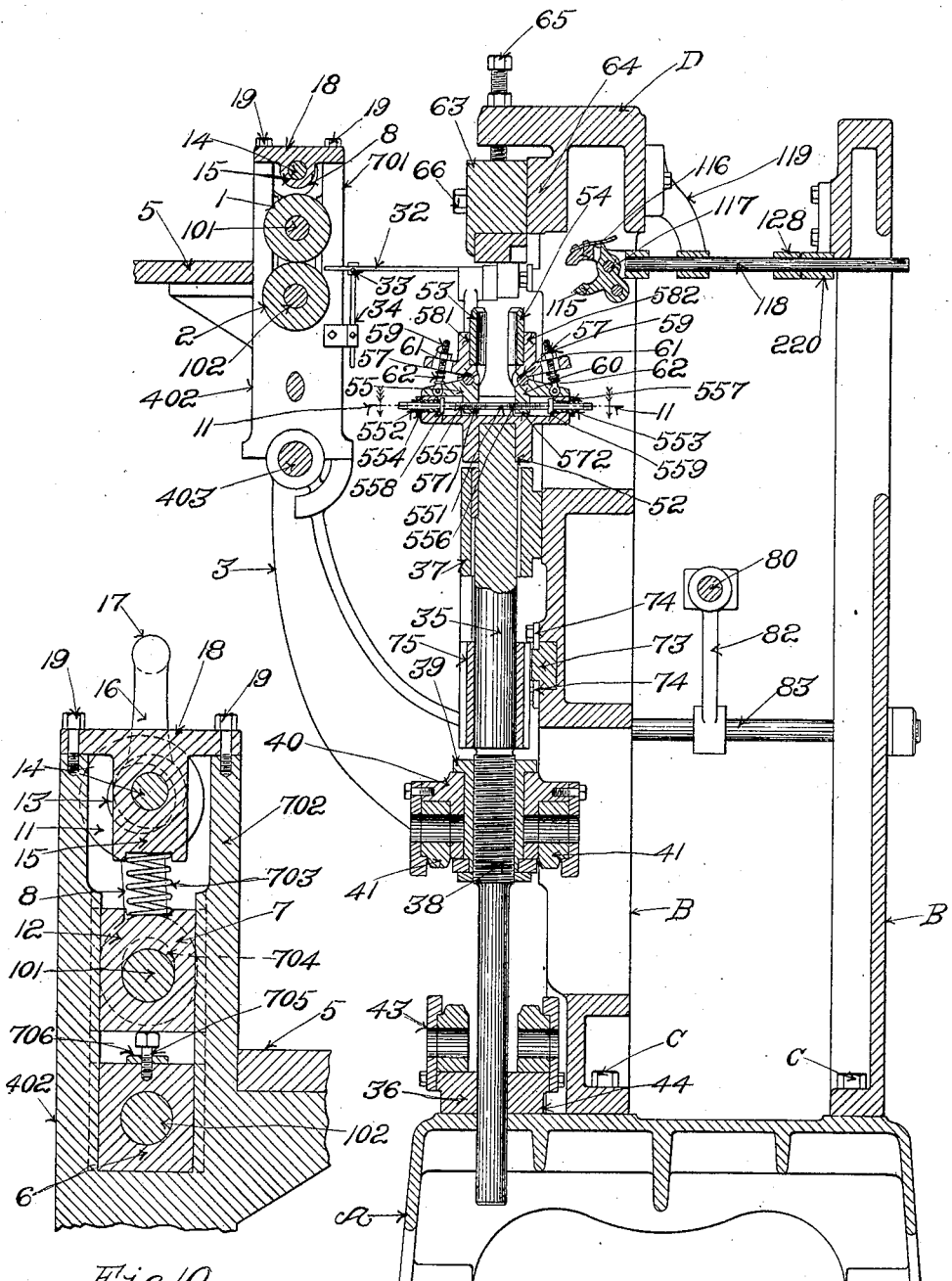

No. 896,953. PATENTED AUG. 25, 1908.
E. H. TAYLOR.
SHANK MACHINE.
APPLICATION FILED MAR. 18, 1905.
6 SHEETS—SHEET 5.
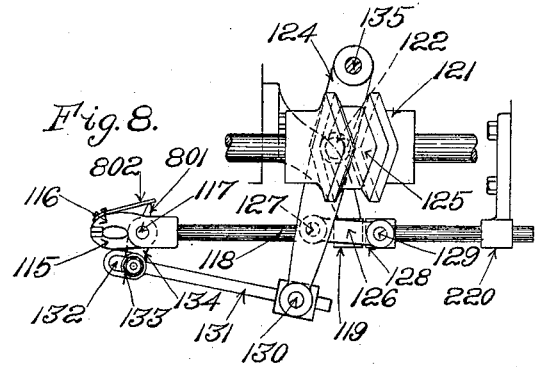
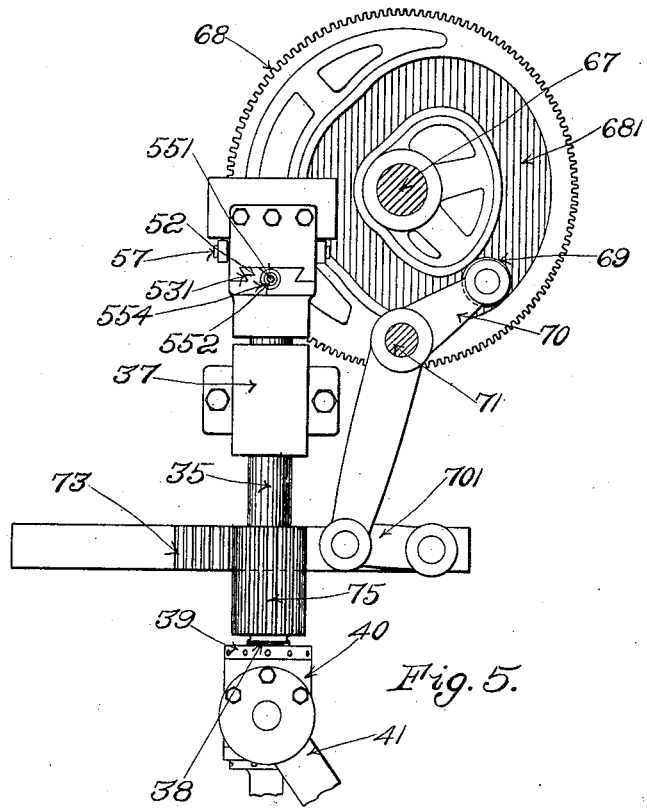

No. 896,953. PATENTED AUG. 25, 1908.
E. H. TAYLOR.
SHANK MACHINE.
APPLICATION FILED MAR. 18, 1905.
6 SHEETS—SHEET 6.
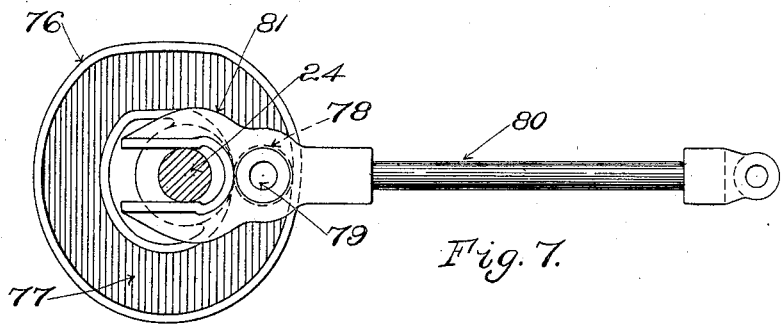
Fig. 7.
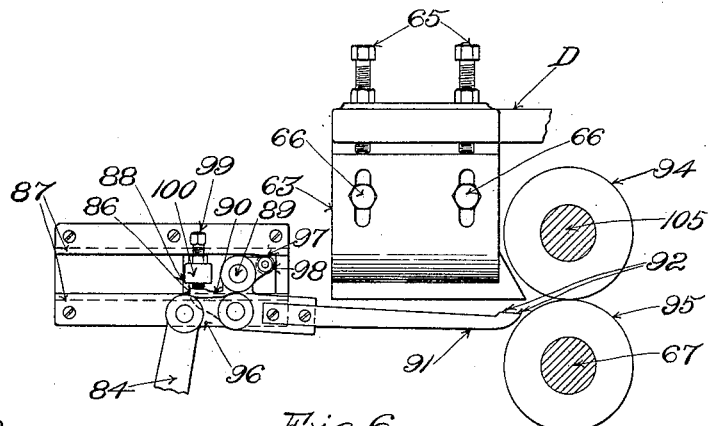
Fig. 6.
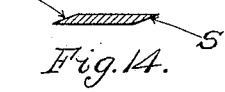
Fig. 14.
Fig. 15.
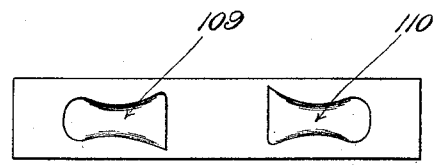
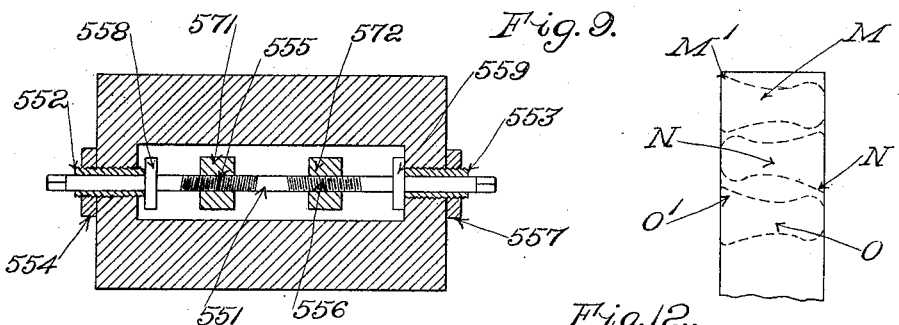
Fig. 9.
Fig. 11. Fig. 12.
Witnesses:
J. Henry Parker
Robert Wallace
Inventor:
Eugene H. Taylor
by Macleod, Calver, Cushman & Bike
Attorneys.

UNITED STATES PATENT OFFICE.

EUGENE H. TAYLOR, OF LYNN, MASSACHUSETTS.

SHANK-MACHINE.

No. 896,953.      Specification of Letters Patent.      Patented Aug. 25, 1908.

Application filed March 18, 1905. Serial No. 250,793.

*To all whom it may concern:*

Be it known that I, EUGENE H. TAYLOR, citizen of the United States, residing at Lynn, county of Essex, State of Massachusetts, have invented a certain new and useful Improvement in Shank-Machines, of which the following is a specification, reference being had therein to the accompanying drawings.

My invention has for its object to provide an improved machine by means of which stiffeners for the shanks of shoes may be cut and molded from leatherboard or other similar material.

The machine embodying my invention presents certain features of construction and operation which I believe to be novel and to be a great improvement over machines for accomplishing the same results heretofore in use, both by reason of the increased speed and consequent output of the machine, and the improved quality of the shanks produced. My machine is also cheaper to build and to operate. The machine is continuous in its operation, being adapted to cut the shanks from a continuous strip of the material, thus doing away with the waste which has heretofore resulted at each end of the strips of leather board. My machine also makes less waste between two successive shanks. It thus produces a very considerable saving in material, as well as in time. It is also arranged so that it requires very little attention from the operator, and I find that one operator can care for from two to four machines while heretofore an operator has been required for each machine. The machine is also adapted for use in cutting stiffeners for either men's or women's shoes, but is especially arranged to be used where one end of the shank is wider than the other.

My invention will be fully understood from the accompanying specification taken in connection with the drawings, and the novel features thereof are pointed out and clearly defined in the claims at the close of this specification.

Figure 2:
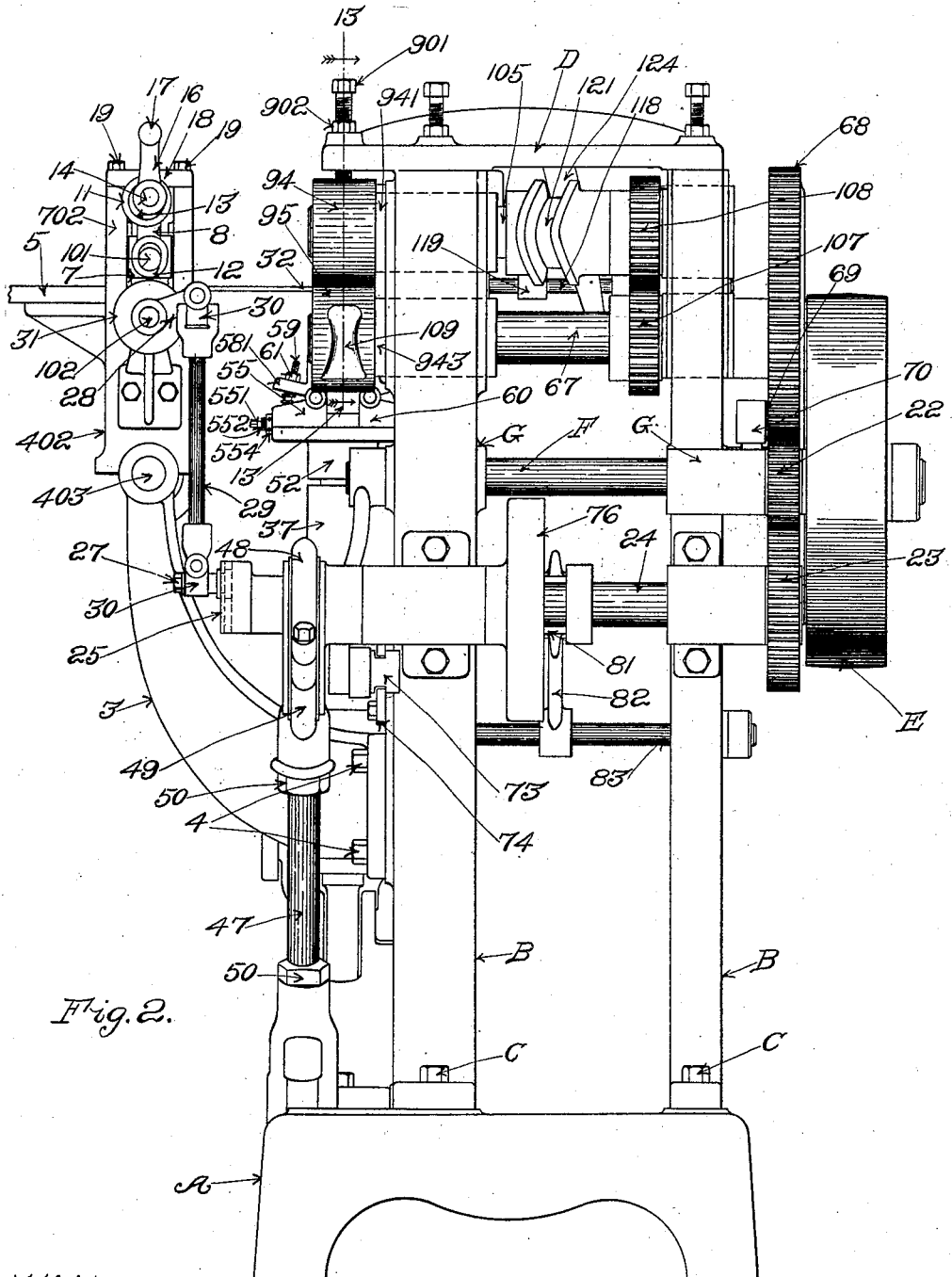

Having reference to the drawings, Figure 1 is a front view of a machine embodying my invention. Fig. 2 is a view of the right hand side of the machine as seen in Fig. 1. Fig. 3 is a plan view thereof. Fig. 4 is a section on line 4—4 Figs. 1 and 3 looking in the direction of the arrows. Fig. 5 is a view of the knife rotating mechanism, hereinafter referred to. Fig. 6 is a view of the blank-transferring mechanism. Fig. 7 is a detail of the cam and actuating means for the blank transferring mechanism. Fig. 8 is a view of the waste stock removing mechanism. Fig. 9 is a development of the periphery of the lower molding roll. Fig. 10 is a section on line 10—10 Fig. 1, and shows the construction of the bearings of the feed rolls. Fig. 11 is a section on line 11—11 Fig. 4. Fig. 12 is a view of the strip of stock showing the arrangement of the blanks cut therefrom. Fig. 13 is a section on line 13—13, Fig. 2 looking in the direction of the arrows. Figs. 14 and 15 are sections of strips of stock illustrating the manner in which it is prepared for use in my machine.

Throughout the specification I will refer to the piece of stock which has been cut out by the knives as the blank, and will designate the molded and finished piece as the stiffener. The piece of stock left by the knives between each blank will be designated the waste.

The progress of the stock through the machine is in general terms as follows: The stock first passes between a pair of feed-rolls which give it an intermittent progressive motion in the direction of the knives. The blanks for the shanks are cut from the forward end of the strip of stock by means of a pair of knives which are rotated 180 degrees after each blank is cut. The blank which has been cut from the stock is then taken from the cutting position by the blank-transferring mechanism and presented to a pair of molding rolls which press the blank into the form of the finished shank. The waste, which is in the form of a small piece, is seized after each cutting operation by the waste removing mechanism, and placed in a suitable receptacle.

In the drawings, and referring more particularly to Figs. 1, 2, 3 and 4, A is the base of the machine, and B, B, are uprights suitably attached to the base A by the cap screws C. The two uprights are connected at the top by a top-plate D. These parts support the various elements comprising the operative mechanism and together constitute the frame of the machine.

At E is indicated a driving pulley mounted upon a main or driving shaft F which is supported in suitable bearings G G in the frame of the machine. A gear 22, fast on the said main shaft, meshes with a gear 23 on the counter-shaft 24. The feeding mechanism, waste-removing mechanism, and the mechanism giving the knives their vertical reciprocation are driven from this countershaft.

Having outlined the general construction of the machine and the way in which some of the parts are driven, I will now describe the mechanism by which the stock is given its intermittent motion and is presented to the knives.

A pair of feed-rolls 1 and 2 on shafts 101 and 102 are suitably supported upon a pair of brackets or arms 3, fastened to the front of the frame of the machine by the cap screws 4. A feed roll frame 402 is pivoted to the said brackets at 403 so that the feed roll frame may be turned down after the parts are disconnected if it is desired to get at the parts which are behind for the purpose of adjustment. In the front of the machine is placed a feed table 5 upon which the strip of stock is placed by the operator ready to be presented to the bite of the feed rolls.

The lower feed roll 2 is supported in boxes 6 (see Fig. 10) formed in the upper part of the bracket 3 and the upper feed roll is carried by the box 7 movable vertically in guides 701 and 702 formed in the upper part of the bracket 3. Across the upper end of the two guides 701 and 702 is placed the cap piece 18, the same being firmly held in place by the cap screws 19. A lug 15 is formed on the under side of the cap piece 18 for the reception of the eccentric shaft 14 fast to which is the eccentric 13. A link 8 connects the said eccentric 13 and the shaft 101, being provided with suitable collars 11 and 12 engaging the said eccentric and shaft respectively. The lower collar 12 is provided with a slot 704, which permits a certain rise and fall of the upper feed roll shaft 101 without moving the eccentric 13. The shaft 14 is provided with a crank 16 and handle 17 thereon by means of which the said shaft and eccentric may be moved. The movement of the handle 17 serves to raise or lower the shaft 101 when it is desirable to disengage the feed rolls 1 and 2. Between the upper surface of the box 7 and the under surface of the lug 15 on the cap piece 18 I place a spiral spring 703 which serves to maintain a uniform pressure on the upper feed roll. An adjustable stop 705 screwing into a hole tapped in the upper side of the box 6, and furnished with a check nut 706 serves to prevent the downward movement of the upper feed roll 1 beyond a predetermined point. If desired, means may also be provided to regulate the pressure exerted by the spring 703 upon the box 7. The foregoing mechanism affords a convenient means by which a uniform pressure may be exerted upon the stock by the feed rolls, while at the same time permitting the operator to release the stock completely, and thus stop its forward movement when desired.

The shafts 101 and 102 of the feed rolls 1 and 2 are turned by gears 20 and 21, the teeth of which mesh with each other so that the two rolls turn simultaneously. These gears are conveniently provided with teeth of a length sufficient to permit the vertical movement heretofore described of the upper feed roll without interference with the working of the said gears. The lower feed roll shaft 102 is provided with a clutch 31 by means of which the said shaft and consequently the feed rolls are given an intermittent motion in the direction of the arrow in Fig. 2. Any suitable or convenient clutch may be used here. In practice I prefer a "roller" clutch of the well known type. Upon the exterior casing of this clutch 31 is formed a crank 28. As has been heretofore stated, the feeding mechanism is actuated by the countershaft 24. The outer or left hand end of this shaft 24 (see Fig. 2) is provided with an adjustable slotted crank 25; the slot in the said crank 25 being indicated by the numeral 26 in Fig. 1. The crank pin 27 on the slotted crank 25 is connected with the crank 28 on the lower feed roll 2 by the pitman rod 29, each end of the said pitman rod 29 being provided with a universal joint 30 which permits the connected parts the required latitude of movement.

By the foregoing arrangement of the parts, it results that the shaft 102 is rotated in the direction indicated by the arrow in Fig. 2 when the pitman 29 is moved downward by the rotation of the slotted crank 25, but remains still during the upward movement of the said pitman. An intermittent motion is thus given to the feed rolls and imparted by them to the stock. The length of the stroke of the crank 28 on the shaft 102 and consequently the distance the stock is fed forward by the feed rolls at each stroke is controlled by the position of the crank pin 27 in the slot 26 of the slotted crank 25. This arrangement is necessary because shank stiffeners of different widths are required to be cut by the same machine.

The stock is guided in its movement from the bite of the rolls to the cutting mechanism, by a pair of adjustable guides 32 (see Fig. 3) adjustably supported by a rod 33 and bracket 34 (see Fig. 4). These guides prevent the forward end of the stock sagging and also assure proper presentation of the stock to the cutting knives.

The cutting operation is performed by a pair of knives operating against the under side of a cutting block 63. I find that this arrangement, by which the knives cut against the under side of the cutting block is a very satisfactory one because the weight of the knives and attached parts tends to hold the knives away from the block and so save the block, also there is no danger of the knives falling against the block when there is no stock in place and thus dulling the knives.

If it is found that the weight of the parts is not sufficient to hold the knives out of contact with the cutting block, a spring may be employed in addition.

A vertical movement is imparted to the knives by the following mechanism: The said knives are supported in a manner which will be hereinafter described, upon the upper end of a vertical knife shaft 35, which is guided in two boxes 36 and 37; the first of which 36 is attached to the base A of the machine, and the second, 37, to the frame B near the upper end of the said knife shaft 35. The knife shaft is moved up and down in the boxes 36 and 37 by means of a toggle joint.

The knife-shaft 35 is provided near its middle with a screw-threaded portion 38 upon which fits an internally threaded collar 39, which receives the pressure of the toggle-joint collar 40 connected with the upper end of the link 41 of the toggle-joint. The screw threads 38 provide a convenient means for the vertical adjustment of the knife-shaft 35, with relation to the said toggle-joint so that the pressure exerted by the knives upon the cutting block 63 may be varied, and so that the knife shaft 35 may be moved upwardly to compensate for the wear of the knives. A check nut 38 is also provided to prevent the parts working loose. The other member of the toggle joint consists of a bell-crank lever 42 pivoted at 43 to a lug 44 suitably attached to the base of the machine. The link 41 and the bell crank lever 42 are pivotally connected with each other, as shown at 45. The downwardly extending arm of the bell-crank lever 42 is also pivotally connected at 46 with the eccentric rod 47. This eccentric rod 47 is attached at its upper end to the eccentric straps 48 and 49. The length of the pitman rod 47 is slightly adjustable in the well known manner, as indicated by the check nuts 50 at each of its ends. An eccentric 51 on the counter shaft 24 serves to operate the pitman 47 and its connected parts. It will be seen that since the feeding mechanism is also operated by the same counter shaft the knife shaft 35 makes one complete vertical reciprocation for each forward movement imparted to the stock by the feed rolls 1 and 2.

Heretofore it has been the custom in preparing stock for a shank stiffener machine to bevel it on one edge of each face as seen (Fig. 14) where there is shown a section of a strip of stock. It will be seen that the stock is beveled at R on the upper face and at S on the lower face. In preparing stock for use in my machine, it is cut as shown in Fig. 15 with both bevels W and Z on the same face of the strip of stock. This method places the larger amount of the stock at the point where it is wanted and a stronger stiffer and more perfect stiffener is produced thereby. Heretofore in the manufacture of shank stiffeners it has also been customary to have the machine cut the successive blanks with the knives in the same relative position for each operation, the operator turning the strip of stock over after each blank is cut to prevent the waste which would otherwise occur since the toe end of the stiffener is wider than the heel end. In my machine I do away with the necessity of turning the stock by turning the knives themselves through an angle of 180 degrees after each blank has been cut, thus reversing the knives and bringing the heel end of the knives opposite the toe end of the preceding blank. This mode of operation makes it unnecessary for an operator to be in constant attendance upon the machine. I find it convenient to provide the stock for my machine in substantially continuous strips beveling the ends of the strips into which the sheets of leather-board are cut and cementing these ends together. In this way it is possible for one operator to tend from two to four machines, while by the former methods an operator has been required for each machine.

Referring now to Fig. 12 there is there shown a strip of stock from which the blanks are cut, and the arrangement of the blanks in the strip separated slightly. The blanks as shown are made wider at one end than at the other, and wider on one side than on the other. The first blank M is shown as being considerably wider at the upper left hand corner which I have designated M'. The second blank cut is shown at N, with its widest portion at N'; the third blank at O, with its widest portion at O' in the same relative position as the first blank M. It will thus be seen that the two narrow sides of the adjacent blanks M and N come together, while the two wide sides of the adjacent blanks N and O come together. If the knives rotate about the exact center of the knife shaft it will be seen that the stock must be fed each time a distance sufficiently great so that the two wide sides when they come together will not overlap, and that an unnecessarily large amount of waste between the next two blanks, the narrow sides of which come together, will be left. To avoid this waste, I locate the knives slightly eccentrically of the center of rotation of the knife shaft, this eccentricity being in the line of movement of the stock, and being proportionate to the difference in width of the two sides of the blank. In this way approximately the same amount of waste is left between each pair of blanks cut. Where it is desired to produce blanks the sides of which are symmetrical, such as are commonly used in ladies' shoes, I set the knives on center.

The knives are supported in the following manner upon the knife shaft to obtain this eccentricity, and so that the width of blank cut may be adjusted. At the upper end of the knife shaft 35 is placed a cap-piece 52 upon which are located two knife supports 55 and 60, one for each knife. These knife supports 55 and 60 are movable relatively to the cap-piece 52 upon a dove-tailed slide 531 formed on the upper surface thereof, a corresponding dove-tailed groove being formed in the under side of the said knife supports. The upper surface of the cap-piece 52 is cored out as seen in Fig. 11 in a rectangular form to allow the longitudinal movement of a pair of lugs 571 and 572, formed on the under side of the knife supports 55 and 60. A long adjusting bolt or screw 551 passes through holes drilled and tapped in the said lugs and through sleeves 552 and 553 screwed into holes in the opposite end of the said cap-piece. The adjusting bolt has upon it at the proper places, shoulders or collars 558 and 559, which rest against the said sleeves 552 and 553. These sleeves 552 and 553 are both furnished with right hand screw threads and collars 558 and 559 so that they may be turned in or out of the cap-piece and when in the desired position may be held permanently in place. The adjusting bolt 551 is provided with left hand threads at 555 where it passes through the lug 571 and with right hand threads 556 where it passes through the other lug 572. The bolt 551 is also provided with a squared head by means of which it may be conveniently rotated.

The mechanism just outlined, furnishes a very convenient arrangement by which the knives may be adjusted with relation to each other and also with relation to the center of rotation of the knife-shaft. If it is desired to move the knives nearer together, to cut a narrower shank, the adjusting bolt is rotated by a suitable wrench in the proper direction thus drawing the parts together by means of the right and left screw threads in the lugs 571 and 572. If it is desired that the knives be given a greater or less eccentricity with relation to the center of rotation of the knives and knife shaft 35, the check nuts 554 and 557 are loosened and the sleeves 552 and 553 are turned in the proper direction. The sleeves carry the adjusting bolt 551 and attached parts along with them by reason of the shoulders 558 and 559 on the said adjusting bolt. The knives themselves are attached to knife holders 581 and 582 hinged at 57 to lugs 571 and 572 on the knife-supports 55 and 60. The cutting edges of the knives 53 and 54 are thus allowed movement toward and from each other in the well known manner commonly in use in machines for cutting shank stiffener blanks. The movement of the knives 53 and 54 toward each other is limited by means of hinged bolts 59 pivoted to the knife supports 55 and 60 and provided at their upper ends with nuts 61. About the said hinged bolts 59 are placed spiral springs 62, the lower ends of which rest upon the upper surface of the knife supporting bed 55 and the upper ends of which press against the under surface of the hinged knife holders 581 and 582, thus tending to hold the knives in the position shown in Fig. 4 this being the position at which the cutting is begun. During the cutting operation the cutting edges of the knives move outwardly the said knives and knife-holders swinging about their hinges and compressing the springs 62. The cutting takes place against the under surface of a cutting block 63 suitably supported upon the head 64 of the machine. The cutting block 63 is adjustable vertically by means of the adjusting screws 65, the said cutting block 63 being guided in its movement by the bolts 66.

I will now describe the means by which the knives are rotated after each cutting operation.

Referring now to Figs. 1 and 5, a second counter-shaft is indicated at 67 and is supported in suitable boxes in the upper part of the machine and driven by a gear 68 meshing with the gear 22 on the main drive shaft F. The gear 68 is formed with a cam path 681 in which runs the cam roll 69 on the upper end of the cam-lever 70 which is mounted on the rock shaft 71 carried by the frame of the machine. Fast to the said rock shaft 71 is also attached another arm or lever, the lower end of which is attached by a link 701 to the outer end of a sliding rack 73 which slides in the guides 74 fast to the frame B of the machine. This rack is seen in section in Fig. 4. Fast upon the knife shaft 35 is gear 75 long enough to engage the said rack 73 in any of the various positions given the said gear by the vertical movement of the knife shaft 35. The knife shaft 35 is free to rotate about its vertical axis in the boxes 36 and 37 in which it is guided, and in the collar 40, by means of which the toggle joint is connected with the knife shaft. The gear 68 is of a size such that it makes one revolution for each two revolutions of the gear 23 on the counter shaft 24. The cam path 681 in the gear 68 is so designed that the rack 73, and consequently the knives, remain stationary during the cutting operation and until the knives have been lowered clear of the stock when they are rotated quickly into position to cut the next blank. It is evident from the foregoing description that the mechanism described gives to the knives a rotary reciprocation through 180 degrees, but it is also evident that the same results might be obtained by the complete rotation of the shaft, the shaft being stopped and started again after each 180 degrees rotation.

The blanks are transferred from the knives to the molding mechanism by the following instrumentalities: (see Figs. 1, 6 and 7). Upon the counter shaft 24 is placed a carrier-cam 76 provided with a cam path 77 in which moves the cam roll 78. The cam roll 78 is pivoted at 79 on the cam pitman 80, the said cam-pitman 80 being provided with a forked extremity 81, the two sides of which engage the shaft 24. The rotation of the cam 76 about the countershaft 24 gives to the pitman 80 a reciprocating motion in a substantially horizontal plane, while at the same time allowing the extreme outer end of the said pitman 80 a slight movement in a vertical plane, to accommodate itself to the slightly circular motion of the arm 82 fast on a rock shaft 83 (see Fig. 1). Another arm 84 also fast to the said rock shaft is connected at its upper end by means of the link 96, with the blank carrier. A slide or block 88 upon which the blank carrier is pivoted at 89 moves in a pair of gibs 87 for guides which are suitably secured to the frame B of the machine. The blank carrier consists of a bell crank lever 90 and the carrier arm 91, the latter element being provided at its forward end with forwardly projecting prongs and spurs for engagement with the blank. Just before being cut by the knives the blank is seized by the carrier arm 91 and held against the under side of the cutting block 63 and after the knives have receded it is slid forward to the bite of the molding rolls 94 and 95. When the blank reaches the molding rolls, the forward end of the carrier arm 91 is depressed, and is thus moved out of engagement with the blank. The carrier is given its reciprocation in the horizontal plane by the arm 84 of the rocking lever, actuated as previously described by the cam 76 and the intermediate connections. In order that the forward end of the carrier arm may be given the proper movements in the vertical plane to engage and release the blanks at the proper time, I form the lower edge of the upper gib 87 with a slight depression near the right hand end as shown at 97. The slide or block 88 is made to move somewhat hard or given the proper tension in the gibs 87 so that the action of the arm 84 serves to press the points or spurs 92 of the carrier arm 91 firmly against the blank during the forward movement of the carrier, and to pull the carrier arm 91 downward again when the movement in the other direction is begun. The bell crank lever 90 is provided with a cam roll 98 which runs upon the said cam surface 97 being depressed just before the end of the stroke sufficiently to clear the spurs from the blank. The back end 86 of the bell crank lever 90 engages an adjusting screw 99 in a lug 100 on the block or slide 88. The adjusting screw 99 serves to regulate the amount which the forward end of the carrier arm is depressed during the backward movement of the carrier. By the means just described, the point carrier is thrown out of engagement with the blank just after the front end of the blank is nipped by the molding rolls and the carrier is further depressed and maintained in its depressed position during its reverse movement.

I have adjusted the cam which operates the blank transferring mechanism so that the front end of the carrier 91 has about the same speed as the peripheral speed of the two mold-rolls 94 and 95, at about the time when the blank transferring mechanism presents the blank to the said rolls. I find that this insures the blank being presented to the rolls at exactly the right moment of time and also insures the exact registry of the blank with the concavity of the mold in the surface of the under roll. This results in the production of uniformly molded stiffeners even though the stock varies somewhat in thickness. The blank transferring mechanism since it is actuated by the counter shaft 24 makes one complete movement for each rotation of the said counter shaft, that is to say, a blank is carried forward from the knives to the molds each time the cutting operation is performed and each time the stock is fed forward the width of a shank by the feed rolls.

The lower mold roll 95 is carried by the counter shaft 67 heretofore referred to and the upper roll 94 by a shaft 105. Fast to the two shafts 67 and 105 are gears 107 and 108 which mesh with each other. The lower shaft 67 has fast upon it the gear 68 previously referred to, which meshes with the gear 22 on the main shaft F. The gear 68 is twice the size of the gear 23 which also meshes with the gear 22, thus giving the gear 68 half the speed of the gear 23. It will thus be seen that the molding rolls 94 and 95 make one revolution for each two cycles of the other parts of the machine, i. e. the feeding, blank-cutting, and blank-transferring mechanism. The lower mold roll is provided upon its surface with two matrices 109 and 110 which are clearly seen in Fig. 9, which is a development of the periphery of the roll 95. It will be seen that these matrices 109 and 110 are arranged so that the toe end of one adjoins the toe end of the other. This arrangement of the matrices is necessary on account of the rotation of the knives previously described, and also permits the blank to remain under the pressure of the mold rolls as long as has heretofore been customary in machines of this character, while at the same time permitting the other groups of mechanism in the machine to be operated at a greatly increased speed. In the drawings I have shown the lower mold roll only as furnished with matrices, the stiffeners produced by the machine of the drawing having a curved side and a flat side, the flat side being produced by the smooth upper roll 94. The machine may be employed with equal success to produce shank fasteners having curved surfaces on both sides.

In order that the two mold rolls 94 and 95 (see Fig. 13) may have a slight vertical play, I mount the upper mold roll in a box 941 movable in guides 942, in the frame of the machine. For convenience of removal and adjustment the lower roll 95 may also be similarly mounted in a box 943. Between the two boxes 941 and 943 I place a spring 944 which serves to keep the two mold rolls 94 and 95 out of contact with each other, when there is no stock passing between the said mold rolls. In order that I may have a means of adjustment of the pressure applied by the upper mold roll to the blank, I provide an adjusting screw 901, which is placed in a tapped hole in the cap piece D of the machine, and is held in any desired position by the check nut 902. If it is desired to increase the pressure applied by the upper mold roll, it is only necessary to loosen the check nut 902 and turn the adjusting screw 901, thus moving the box downward the amount desired.

Upon the vertical frame B (see Fig. 13) at a point opposite that at which the finished shank stiffener leaves the mold rolls 94 and 95, I place a guide 111 which is attached to the frame B by post 112. This guide serves to hold the shank stiffener as it comes out from between the molding rolls in contact with the lower roll and in a bent position for a slightly increased period of time, thereby giving to the shank permanently its proper curved form. The guide 111 is attached to the spindle 113 which is free to slide in a corresponding hole in the end of the post 112. About this spindle 113 is a spring 114, of proper stiffness having one of its ends in contact with the outer surface of the guide 111 and its other end in contact with the under surface of a pin 215 in the end of the post or block 112. The said pin 215 serves to hold the spindle 113 from being drawn through the hole in the block or post 112 by the action of the spring.

The waste material left by the cutting knives between each pair of blanks is removed by means of the waste removing mechanism shown in Figs. 4 and 8. This mechanism consists essentially of a pair of horizontally reciprocating pincers which move forward, seize the waste, retreat and drop it in a suitable receptacle. These pincers consist of jaws 115 and 116 pivoted at 117. The jaws are carried upon a sliding pincer rod 118, which moves back and forth in guides 119 and 220 attached to the frame B of the machine. The upper jaw 116 is fixed with relation to the reciprocating pincer rod 118, while the lower jaw 115 is movable about the pivot 117. A projection 801 is formed upon the movable jaw 115, and a spring 802 is attached to the fixed jaw 116 contacting with the said projection 801 so that the movable jaw opens or closes suddenly when the projection or tongue 801 passes the center, and the spring then tends to keep the jaws opened or closed as the case may be.

The waste removing mechanism is operated by cam 121 on the upper molding roll shaft 105, which is driven from the larger gear 68 and makes one revolution for each two cutting operations. Since it is necessary that a piece of waste be removed after each cutting operation, I make this cam 121 so that by each revolution it imparts to the waste removing mechanism two complete cycles of movement. A cam roll or follower 122 carried on the arm or lever 124 which is pivoted to the frame of the machine at 135 runs in the groove 125 in the said cam 121. The lever 124 is operatively connected with the sliding pincer rod 118 by a link 126. The link 126 is pivoted to the lever at 127 and to a collar 128 on the sliding pincer rod 118 at 129. The point of connection of the link 126 and the lever 124 is intermediate the ends of the said lever. At the lower extremity 130 of said lever 124, a jaw link 131 is also pivoted. The other end of the jaw link is furnished with a slot 132 for the reception of a pin 133 on a projection 134 on the lower or movable jaw of the pincers. As the cam 121 rotates the lever 124 is moved to and fro and moves the links 126 and 131, but since the jaw link 131 is pivoted to the said lever at a greater distance from the pivot 135 of the said lever 124 than is the link 126, the said jaw link 131 is given a greater movement than the other link 126. This greater movement of the jaw link 131 operates to move the movable jaw 115 only or just before the extremities of its stroke, by reason of the slot 132. It will be seen that the jaws remain separated during this movement toward the waste stock until just before the end of the stroke, when the end of the slot 132 comes against the pin 133 and the lower jaws snap shut by reason of the spring 802. The jaws remain shut until the other extreme of the stroke when the action of the other end of the slot 132 opens them in a similar manner.

The differential motion given the two links 126 and 131 is a very easy one. The mechanism as a whole affords an effective means of removing the waste stock which will not jar or rack the rest of the machine even when run at high speed.

What I claim is;

1. A machine of the character specified comprising a cutting block and a single set of cutting knives, the said cutting members being movable toward and away from each other, and rotating means for the said cutting knives whereby the heel end of one blank is cut from the portion of the stock opposite the toe end of the preceding blank.

2. In a machine of the character specified, a cutting block, a single set of cutting knives, a pivot therefor and rotating means for the said pivot imparting reciprocatory rotation through 180 degrees to the said pivot and knives after each cutting operation.

3. A machine of the character specified, comprising a cutting block and a single set of cutting knives, the said cutting members being movable toward and away from each other, rotating means for the said knives, imparting thereto a reciprocatory rotation through 180 degrees after each cutting operation whereby the heel end of one blank is cut from the portion of the stock opposite the toe end of the preceding blank.

4. In a machine of the character specified, the combination of a cutting block, and cutting knives rotating after each cutting operation, and located eccentrically of their center of rotation, whereby the heel end of one blank is cut from the portion of the stock opposite the toe end of the preceding blank and allowance is made for difference in width between the two sides of the blank.

5. In a machine of the character specified, a cutting block, a vertically reciprocating knife shaft rotating on its vertical axis and cutting knives arranged transversely of said knife shaft and set eccentrically of the center of rotation of said knife shaft.

6. In a machine of the character specified, the combination of a cutting block, a vertically reciprocating knife shaft rotatable about its vertical axis, cutting knives thereon, and adjustable connecting means between the said cutting knives and the said knife shaft, whereby the eccentricity of the knives with relation to the center of rotation of the knife shaft may be varied.

7. In a machine of the character specified, the combination of a cutting block, a vertically reciprocating knife shaft rotatable about its vertical axis, cutting knives thereon, and an adjusting screw operatively connecting the said cutting knives and the said knife shaft, whereby the eccentricity of the knives with relation to the center of rotation of the knife shaft may be varied.

8. In a machine of the character specified, a cutting block, a knife shaft, cutting knives having cutting edges of a shape corresponding with the shape of the blanks to be cut, said cutting knives being arranged transversely of the said knife shaft, a toggle joint operatively connected to the said knife shaft and imparting to the same vertical reciprocatory motion, and rotating means for said knife shaft whereby the heel end of one blank is cut from a portion of the stock opposite the toe end of the preceding blank.

9. In a machine of the character specified, a cutting block, a knife shaft, cutting knives having cutting edges of a shape corresponding with the shape of the blank to be cut, said cutting knives being arranged transversely of the said knife shaft, means imparting a vertical reciprocatory motion thereto and a rack and gear operatively connected with the said knife shaft whereby the said knife shaft is also given a rotary reciprocation about its vertical axis and the heel end of one blank is cut from a portion of the stock opposite the toe end of the preceding blank.

10. In a machine of the character specified, a cutting block, cutting knives, a knife shaft therefor, a toggle joint imparting a vertical reciprocation to the said knife shaft, a rack and gear imparting a rotary reciprocation thereto, and a cam and follower operating the said rack and gear and causing the said knife shaft to rotate through 180 degrees after each cutting movement of the said knife shaft.

11. In a machine of the character specified, the combination of a cutting block, cutting knives rotatable through 180 degrees after each blank is cut, whereby the heel end of one blank is cut from the portion of the stock opposite the toe end of the preceding blank, blank transferring mechanism and molding mechanism provided with two matrices having their corresponding ends adjacent each other.

12. In a machine of the character specified, the combination of cutting mechanism delivering successive blanks in a reversed position, blank transferring mechanism, and molding mechanism with matrices in reversed position corresponding to the position of the cut blanks.

13. In a machine of the character specified, the combination of cutting mechanism delivering alternate blanks with the toe ends in front, blank transferring mechanism and molding rolls provided with two matrices arranged with the toe ends and heel ends adjacent each other to correspond with the position in which the blanks are received from the cutting mechanism.

14. In a machine of the character specified, the combination of cutting mechanism, molding mechanism, a pivoted reciprocating carrier, and a fixed cam surface operating to depress the carrier at the end of the stroke and release the blank.

15. In a machine of the character specified, the combination of a cutting block, cutting knives, molding mechanism, means extending from the cutting block to the molding mechanism and an upwardly pressed blank transferring carrier coöperating therewith to press the blank against the under side thereof and transfer it to the molding mechanism.

16. In a machine of the character specified, the combination of a cutting block, cutting knives, an upwardly pressed blank transferring carrier, and molding mechanism, said cutting block being provided with a forward extension against the under surface of which the blank is held by the carrier during its movement from the cutting to the molding position.

17. In a machine of the character specified, the combination of a group of mechanisms comprising feeding mechanism, knife-reciprocating mechanism, and blank transferring mechanism, a second group of mechanisms comprising molding mechanism, and knife rotating mechanism, and means causing the first mentioned group of mechanisms to perform its cycle of movement twice for each cycle of movement of the other group.

18. In a machine of the character specified, the combination of a group of mechanisms, comprising feeding mechanism, knife-reciprocating mechanism, and blank transferring mechanism, a shaft causing the said mechanisms each to perform one cycle of movement for each revolution of the said shaft, a second group of mechanisms comprising molding mechanism, and knife rotating mechanism, and a second shaft causing each of the said second group of mechanisms to perform its cycle of movement once for each two revolutions of the first mentioned shaft.

19. The feeding mechanism of the character described comprising a pair of feed rolls, boxes for the ends of the upper feed roll vertically movable in the frame of the machine, a shaft, a pair of eccentrics one at each end of the said shaft, and connecting links between the said eccentrics and the ends, the shaft of the said upper feed roll, whereby the said upper feed roll may be raised or lowered by a movement of the said eccentric shaft.

20. The feeding mechanism of the character described comprising a pair of feed rolls, a box for each end of the upper feed roll vertically movable in the frame of the machine and springs between said boxes and the said frame of the machine tending to hold the upper roll in contact with the lower feed roll, a shaft, a pair of eccentrics one at each end of said shaft and connecting links between the said eccentrics and the ends of the shaft of the said upper feed roll, whereby the said upper feed roll is raised or lowered by a movement of the said eccentric.

21. The feeding mechanism of the character described, comprising a pair of feed rolls, a box for each end of the upper feed roll vertically movable in the frame of the machine, a shaft, a pair of eccentrics one at each end of said shaft and connecting links provided with slots at their lower ends for the reception of the ends of the shaft of the upper feed roll, whereby the upper feed roll is permitted play vertically without interfering with the operation of the eccentric shaft.

22. In a machine of the character specified, the combination with cutting mechanism, of waste removing mechanism comprising a horizontally reciprocating fixed jaw, a movable jaw pivoted on the fixed jaw and coöperating therewith, a lever connected between its ends with the fixed jaw and operating to reciprocate the same, said lever also being connected at its extremity to the said movable jaw whereby the said jaws are reciprocated and the movable jaw moved toward and away from the said fixed jaw.

23. In a machine of the character specified, the combination with the cutting mechanism, of waste removing mechanism comprising a pair of reciprocating jaws, one of which is provided with a bell crank lever, a slotted link coöperating therewith a lever operatively connected to the said jaw at a point between its ends and at one end to the slotted link, and operating means for the said lever whereby the said jaws are reciprocated, and the movable jaw moved toward or away from the fixed jaw, at each end of the stroke by the action of the said slotted link.

24. In a machine of the character specified, the combination with the cutting mechanism, of waste removing mechanism comprising a pair of reciprocating jaws, one of which is provided with a bell crank lever, a slotted link coöperating therewith, a lever operatively connected to the said fixed jaw at a point between its ends and at one end to the slotted link, and operating means for the said lever whereby the said jaws are reciprocated and the movable jaw moved toward or away from the fixed jaw at each end of the stroke by the action of the said slotted link and a spring and tongue operating to keep the jaw opened or closed during the time intermediate the action of the slotted link at each end of its stroke.

In testimony whereof I affix my signature, in presence of two witnesses.

EUGENE H. TAYLOR.

Witnesses:
GEORGE P. DIKE,
J. HENRY PARKER.